Dec. 20, 1960  M. J. A. CHARBONNEL  2,965,353
PIPE BLIND, MORE PARTICULARLY FOR HYDROCARBON PIPELINES
Filed April 22, 1958  3 Sheets-Sheet 1

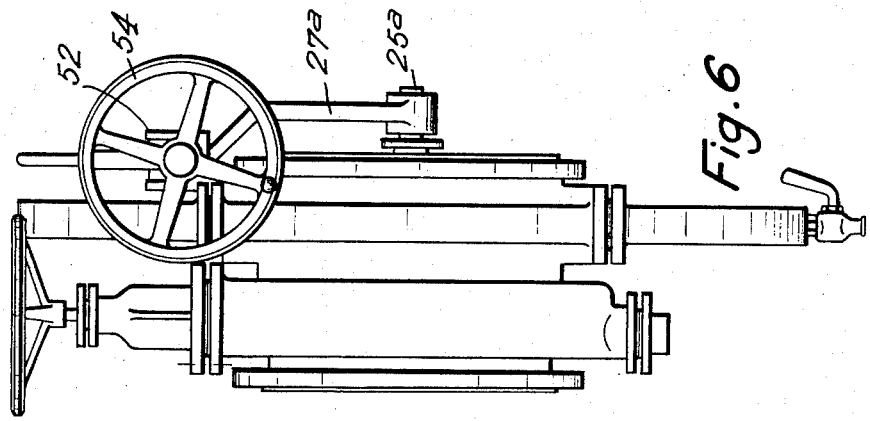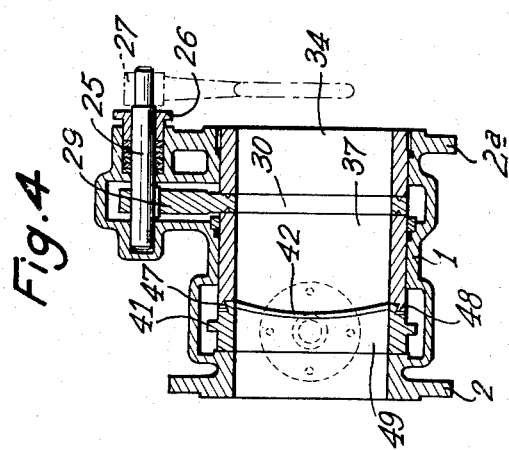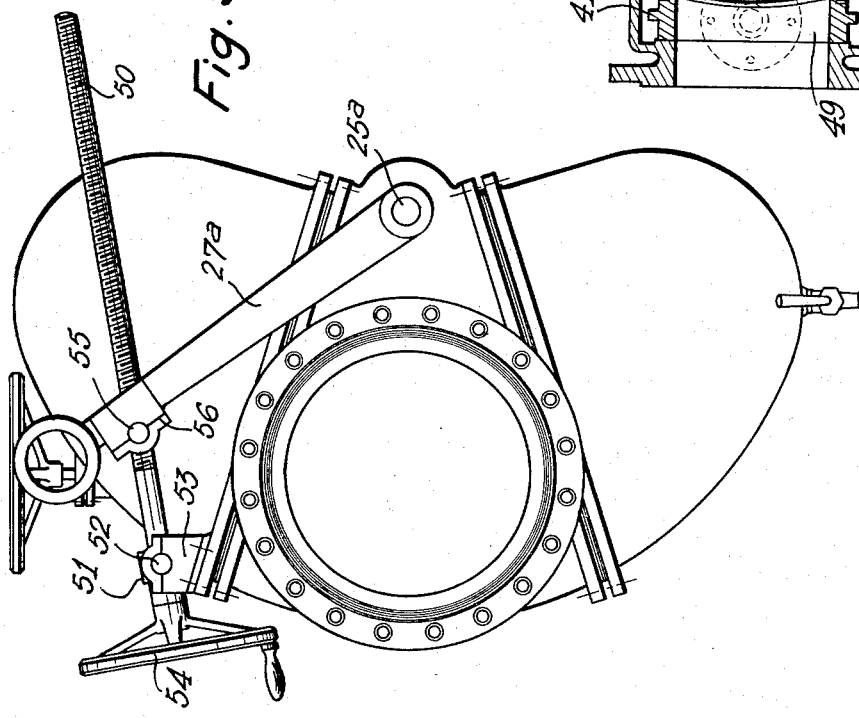

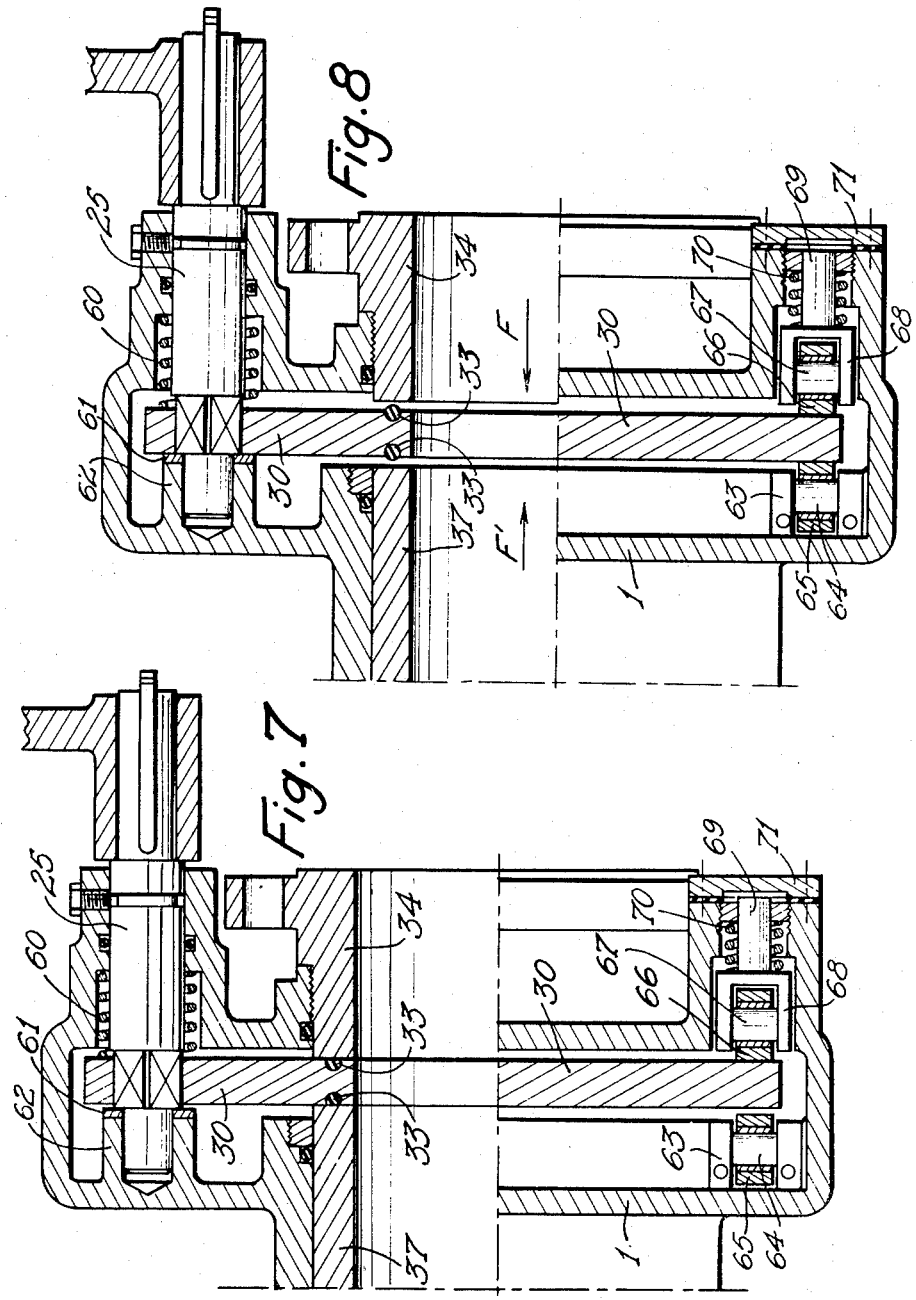

United States Patent Office 2,965,353
Patented Dec. 20, 1960

2,965,353

PIPE BLIND, MORE PARTICULARLY FOR HYDROCARBON PIPELINES

Maxime Joseph Antoine Charbonnel, Paris, France, assignor to Societe Technique et Commerciale d'Installations Industrielles "Luceat," Sens, France Filed Apr. 22, 1958, Ser. No. 730,157

Claims priority, application France Apr. 23, 1957

8 Claims. (Cl. 251—158)

As conventional valves are liable to uncontrollable leaks, blinds are to be preferred or even to be necessarily used if a really tight sealing is required, for example in the case of pipe lines for oil products subjected to custom checkings.

The present invention relates to such a blind having improved properties of tightness, ease of operation and maintenance with respect to known blinds.

According to the present invention, a pipe blind comprises a one-piece body extending between the flanges for coupling said body with the adjacent pipe sections and provided with caps sealingly secured to said body, one pair of caps containing a blind plate pivotally mounted on a shaft which is operated from outside and extends through a stuffing-box whereas another pair of caps, also sealingly secured, are provided with guide and control members for an apertured wedge positively connected to a blind clamping sleeve coaxial with the blind body bores and slidably mounted in said body.

In this way, the inner members of such a blind can be inspected and attended to, in successive steps, by removing a cap which gives an access by inspection and care, without interrupting the operation. With this arrangement, it is no longer necessary, as usual, to associate shut-off valves with the blind.

In order that the invention may be better understood and readily carried into practice, some embodiments thereof will now be described more fully with reference to the accompanying drawings, in which:

Fig. 4 is a section on the line IV—IV of Fig. 1.

Figs. 5 and 6 are respectively a front view and a side view showing a modified embodiment of the blind.

Figs. 7 and 8 are somewhat diagrammatical sectional views showing the arrangement of supporting rollers, the blind being shown respectively clamped and released by the sliding sleeve.

Figure 3:
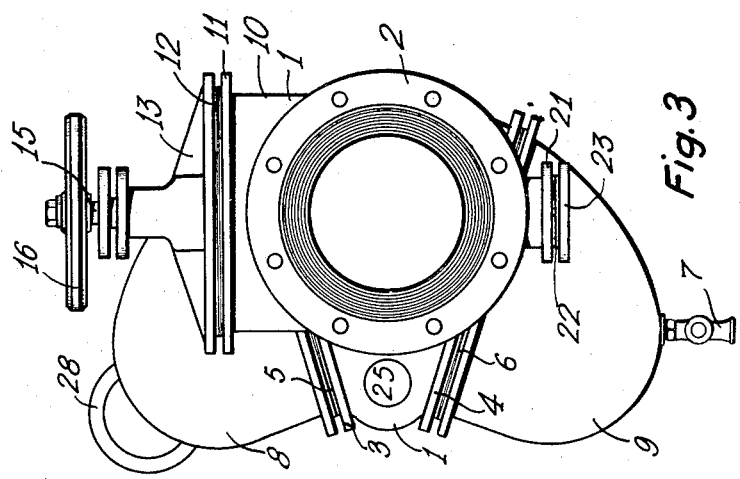
Fig. 3 is a left side view of the blind shown in Fig. 1.
Figure 1:
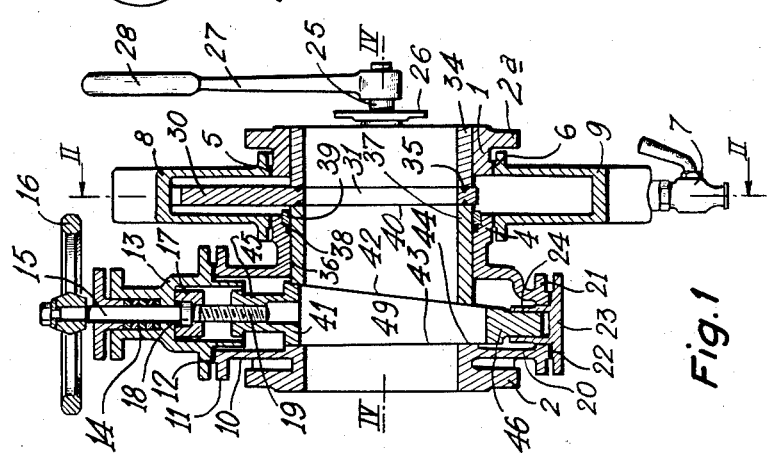
Fig. 1 is a sectional view of a blind according to the invention.
Figure 2:
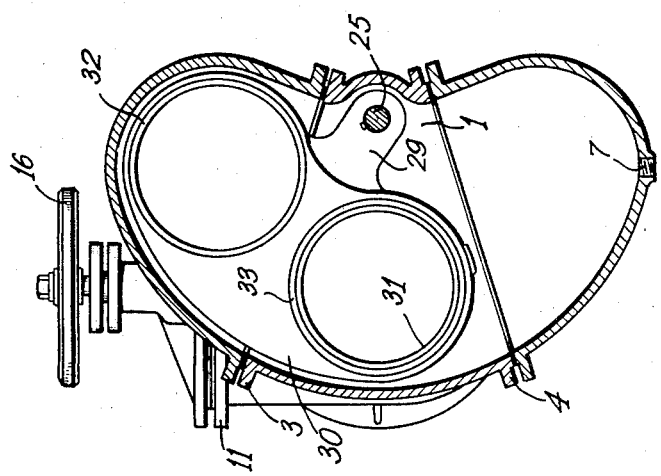
Fig. 2 is a section of the blind on the line II—II of Fig. 1.

Referring to Figs. 1 to 4, the blind illustrated therein comprises a one-piece body 1 formed with end flanges 2, 2a for coupling said body to adjacent pipeline sections. Said body 1 is formed, in its intermediate portion, with a hollow extension having the shape of a sector of a circle limited by generally rectangular bearing flanges 3, 4 for sealing gaskets 5, 6 whereon are applied caps 8, 9, the lower cap 9 being provided near its lowermost point with a check cock 7.

Adjacent the flange 3 engaged by the cap 8, the body 1 is formed with a generally prismatic extension 10 terminating with a generally rectangular bearing flange 11 forming an entrant opening; said flange receives a sealing gasket 12 surmounted by a cap 13 which contains packing rings 14 around an operating rod 15 carrying an outer handwheel 16, an inner abutment member 17 maintaining the rod 15 by a collar 18 thereof, said rod having also an inwardly threaded extension 19, the whole forming a clamping mechanism for a wedge to be described hereinafter.

Opposite the extension 10, the body 1 is formed with another extension 20, substantially tubular, which is provided with a bearing flange 21 for a sealing gasket 22 and a plug 23 having an inner extension 24 in the form of a prismatic guide socket.

All the above described caps are clamped on the body, with the interposition of gaskets, by means of sets of nuts and bolts or studs passing through holes in the corresponding flanges.

The extension having the shape of a sector of a circle and limited by the flanges 3, 4 is formed in its narrower portion with support bearings for a shaft to operate a blind plate. One of said support bearings is formed as an inner blind bore and the other one or further support bearing is provided with a packing pressed by a gland 26 around the projecting portion of the shaft 25 carrying at its end an operating lever 27 formed with a ring 28 for showing its position far away. On said shaft 25 is slidably keyed an arm 29 extending from a plate 30 having the shape of a bean and formed with an aperture 31 adjacent one of its ends. Both faces of the plate are formed with grooves wherein are inserted sealing O-rings 32, 33 of resilient material, the rings 32 surrounding a solid portion of the plate whereas the rings 33 surround the edge of the aperture 31 at a small distance therefrom.

In the bore of the body 1, adjacent the flange 2a, is screwed a bearing sleeve 34 locked in the position where its inner face 35 just engages the corresponding face of the blind plate 30.

The middle portion of the body 1 is formed with a bore 36 slidably engaged by a sliding sleeve 37 and wherein is cut a groove to receive a sealing O-ring 38 maintained by a retaining ring 39 screwed into the end of the bore 36. The inner circular end face 40 of the sleeve 37 is adapted to engage the corresponding face of the blind plate 30. The outer end face 42 of said sleeve, cut askew and therefore elliptic, slidably engages the corresponding skew face of an operating wedge 41 the opposite face of which 43 slidably engages a corresponding facing 44 formed in the body 1 in register with the extensions 10, 20 of said body.

The wedge 41 has an upward extension 45 formed with a threaded bore to be engaged by the threaded end 19 of the operating rod 15, and a downward prismatic guiding extension 46 engaging the guiding socket 24 of the plug 23.

On the skew inner face 42 of the wedge 41 are formed parallel dovetail tongues 47 slidably engaging corresponding grooves formed in the cooperating skew face of the sleeve 34. The wedge is thus positively connected to the sleeve 37 (Fig. 4).

The wedge 41 is formed with an elongated aperture 49 registering with the bores of the flange 2 and of the sleeves 34, 37, having the same width as the inner diameter of the pipeline.

Such a pipe blind operates as follows:

Before actuating the lever 27 to bring either the solid portion or the aperture 31 of the blind plate in register with the bores of the sleeves 34, 37, the hand-wheel 16 is turned in the proper direction to release the blind plate, so that the wedge 41 is moved upwards and the sleeve 37 outwards, the wedge being guided by its prismatic end 46 in the guiding socket 24 and thus moving the sleeve 37 through the tongues 47 and the grooves 48. The sealing rings 32, 33 may expand freely since the inner arm 29 may slide on the key connecting it to the shaft 25 for rotation therewith. As soon as the sealing rings are free, the lever 27 can be actuated in the desired direction. Thereafter, sealing is restored by clamping again the blind plate and the sealing rings thereof between the opposite ends of the sleeves 34, 37 by means of the handwheel 16 through the wedge 41.

In pipelines where one face of the blind plate 30 is liable to be subjected to high pressures, it is convenient to support said blind plate against rollers or balls fitted in the caps 8, 9 or in the flanges 3, 4, the rollers which respectively engage the opposite faces of the plate being just so spaced as to permit the expansion of the sealing rings 32, 33. Such a device may comprise, as illustrated in Fig. 7, a spring 60 mounted about the operating shaft 25 of the blind plate 30 to urge the latter, by causing it to slide on the keying means, towards a friction ring 61 surrounding the end of the shaft 25 against the bearing 62 formed in the body 1 for said shaft end. Said bearing 62 is on the same side as the sliding sleeve 37 with respect to the plate 30.

The body 1 is provided, on the side opposite the outward projection of the shaft 25, with fixed supporting elements 63 for the pins 64 of rollers 65 adapted to be engaged by the longer circular segment of the periphery of the plate 30. Said rollers 65, mounted on fixed pins, are on the same side as the sleeve 37.

The plate 30 is moreover permanently engaged on its other side by rollers 66 the pins 67 of which are supported by yokes 68 provided with guide rods 69 about which are mounted compression springs 70. Said yokes, guides and springs are accommodated within corresponding housings formed in the body 1 and closed by suitably secured and sealed covers 71. The springs 70 urge the plate 30 in the same direction as the spring 60.

As shown in Fig. 7, when the plate 30 is clamped by the sleeve 37, the sealing rings 33 are squeezed between the end faces of the sleeves 34, 37, and the springs 60, 70 are compressed. When the sleeve 37 is released by means of the handwheel 16, for example, as shown in Fig. 8, the springs 60, 70 urge the plate to engage the ring 61 and the rollers 65. Said ring and rollers limit the movement of the plate 30 to the left, as viewed in the drawing, and, even if the solid portion of said plate is subjected to a highp ressure in the direction of the arrow F, the sealing rings 33 will be released without being crushed against the end face of the sleeve 37. Moreover, the sealing rings are not rubbed when the plate 30 is shifted and this shifting operation is easier since opposed only by rolling resistances.

Where the pressure is exerted in the direction of the arrow F' (Fig. 8), it is only necessary that the load of the springs 60, 70 on the blind plate 30 be stronger than the pressure thrust. The blind plate is thus moved to the released position shown in Fig. 8. If high pressures may act on both faces of the plate 30, it is advisable to provide two wedges and operating devices, one on each side of the blind plate. In such a case where two wedges are provided with one sliding sleeve on each side of the plate, all the rollers 65, 66 may be mounted on fixed pins and two fixed rings 61 provided on either side of the plate arm 29.

The just described arrangements eliminate causes of damage to the sealing rings, and even permit to convert such a blind into a high pressure tight gate valve.

The sealing rings 32 or 33 of the blind plate 30 can be replaced while the device is in use by successively removing the caps 8, 9. The sealing ring 38 can be replaced by removing the retaining ring 39. The guiding socket 24 can be cleaned by simply removing the plug 23.

The operation of the device may still be facilitated by suitably choosing the component materials, the moving parts such as the wedge 41 being made of bronze. It is convenient to polish and chromium-plate the bearing surfaces of the sleeves 34, 37. The sealing action is strong without however requiring a great operating force, owing to the association of the wedge 41 with the screw 19. The stroke necessary for blocking is short, so that the maneuver may be quicker.

The position of the blind plate can be ascertained from very far away owing to the provision of the ring 28 on the operating lever.

By using O-rings, owing to the high degree of contraction to which they are subjected, in particular between the polished and chromium-plated faces of the sleeves 34, 37, any leakage in operation is avoided. Should however a leakage occur, it can be detected by means of the check cock 7.

As shown in Figs. 5, 6, more particularly for large size blinds, the shaft 25a and the lever 27a may be operated through a screw-and-nut gear 50. The screw rod turns in a thrust bearing 51 pivoted by means of trunnions 52 in bearings 53 secured to the blind body. A handwheel 54 is carried at the end of the screw rod. The nut is pivoted by means of trunnions 55 in bearings 56 carried by the lever 27a. Such a reduction gear enables to operate large size blinds.

Of course, without departing from the scope of the present invention as defined in the appended claims, modifications may be made in the above described embodiments.

What I claim is:

1. A plate blind for pipes comprising in combination: a one-piece body having a bore therethrough, a passage opening therethrough for the blind plate and an entrant opening, said passage opening being transverse to said through bore, a first pair of flanges on said body, each of said flanges surrounding an orifice at the corresponding end of said bore for coupling said body with adjacent pipe elements, a second pair of flanges on said body each of which surrounds said passage opening for the blind plate, a cap for each flange of said second pair of flanges sealingly and detachably coupled thereto, the wall of each of said caps surrounding a clearance space for said plate, a third pair of flanges on said body, one flange of said third pair of flanges surrounding said entrant opening, a clamping mechanism mounted on said body and passing through said entrant opening, a first cover sealingly and removably received on the other flange of said third pair of flanges, an inner guide provided on said first cover, a second cover sealingly and removably received on said one flange of said third pair of flanges, control means for said clamping mechanism coupled to said second cover, a bearing passing through a wall of said body, an operating shaft passing through said bearing sealingly and pivotably received thereby, an arm slidably keyed to said operating shaft for coupling thereto said blind plate, a bearing sleeve fixedly positioned to said body within said bore in said body on one side of said plate, a sliding sleeve positioned within said bore on the opposite side of said plate slidingly and sealably mounted and substantially parallel to said operating shaft, said sliding sleeve having two end faces, one of said end faces having a transverse bearing surface facing one of the sides of said plate, the other of said end faces having a skew bearing surface, a wedge mounted within said body in a transverse direction to said sliding sleeve and having a skew bearing surface complementary to and engaged with the skew bearing surface of said sliding sleeve, means coupling one end of said wedge to said clamping mechanism, the other end of said wedge being coupled to said inner guide of said first cover, and means on said wedge and said sliding sleeve positively coupling them together for imparting movement from said clamping mechanism to said sliding sleeve whereby movement of said wedge in a first direction transverse to said bore is effective to disengage said sliding sleeve from said plate to permit the free movement thereof by said operating shaft and movement of said wedge in a second direction opposite to said first direction is effective to engage said sliding sleeve with said plate to prevent the free movement thereof by said operating shaft.

2. A plate blind as claimed in claim 1 wherein said plate is provided with a pair of circular grooves in each of its faces and an aperture, two of said grooves surrounding a solid portion of said plate on each side of said plate and two other of said grooves being provided on each side of said plate surrounding said aperture, sealing joints of resilient material being provided in said grooves to cooperate with said one end face of said sliding sleeve and said bearing sleeve.

3. A plate blind as claimed in claim 1 including a support bearing formed in said body for supporting one end of said operating shaft, said support bearing being positioned on the same side as said sliding sleeve relative to said plate and limiting the movement of said arm relative to said operating shaft and a further support bearing formed in said body for supporting said arm and positioned on the opposite side of said plate relative to said sliding sleeve.

4. A plate blind as claimed in claim 3 including a spring positioned on said operating shaft, bearing on said body and said arm and disposed between said body and said arm on the side opposite to said sliding sleeve, relative to said plate.

5. A plate blind as claimed in claim 1 including a support bearing for supporting one end of said operating shaft, said support bearing being positioned within said body opposite said arm, on the same side as said sliding sleeve, relative to said plate, at least one rolling means disposed on the opposite side of said sliding sleeve, relative to said plate, a fixed support for said rolling means supported within said body, said rolling means being located remote from said plate when the latter is in contact with said support bearing.

6. A plate blind as claimed in claim 1 including a support bearing positioned within said body opposite one face of said arm, on the same side as said sliding sleeve, relative to said plate for limiting the axial movement of said arm relative to said operating shaft, a spring bearing on said arm on the other face thereof, solid rolling means disposed on the side of said plate facing said support bearing, fixed support means coupled to said rolling means for fixedly positioning them relative to said housing, said solid rolling means being located remote from said plate when the latter is in contact with said sleeve bearing.

7. A plate blind as claimed in claim 6 including a second rolling means positioned on the side of said plate facing said bearing sleeve and elastic means constantly urging said second rolling means against said plate.

8. A plate blind as claimed in claim 1 in which said wedge is provided with an internally threaded portion, a bearing carried by said second cover, and said clamping mechanism includes a shaft having a shank portion pivotably and sealingly mounted within said last-mentioned bearing and a threaded end portion for coupling to said internally threaded portion for coupling said clamping mechanism to said wedge, said internally threaded portion being opposite to said inner guide.

References Cited in the file of this patent

UNITED STATES PATENTS

| | | |
|---|---|---|
| 165,493 | Morse | July 13, 1875 |
| 1,168,490 | Duncan | Jan. 18, 1916 |
| 1,738,450 | Ryan | Dec. 3, 1929 |
| 1,813,418 | O'Leary | July 7, 1931 |
| 2,156,967 | Brosius | May 2, 1939 |
| 2,558,247 | Hamer | June 26, 1951 |
| 2,580,595 | Renfro | Jan. 1, 1952 |
| 2,599,828 | Hay | June 10, 1952 |
| 2,688,987 | Whalen | Sept. 14, 1954 |
| 2,709,455 | Greenwood | May 31, 1955 |